US009383465B2

(12) United States Patent
Frydman et al.

(10) Patent No.: US 9,383,465 B2
(45) Date of Patent: Jul. 5, 2016

(54) QUANTITATIVE ANALYSIS OF TIME-LAPSE SEISMIC DATA

(71) Applicant: SCHLUMBERGER TECHNOLOGY CORPORATION, Sugar Land, TX (US)

(72) Inventors: Marcelo Frydman, Rio de Janeiro (BR); Carlos Eduardo Borges De Salles Abreu, Rio de Janeiro (BR); Rodrigo Portugal, Rio de Janeiro (BR); Jorge Aurelio Santa Cruz Pastor, Rio de Janeiro (BR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 656 days.

(21) Appl. No.: 13/849,307

(22) Filed: Mar. 22, 2013

(65) Prior Publication Data

US 2013/0250726 A1    Sep. 26, 2013

Related U.S. Application Data

(60) Provisional application No. 61/615,148, filed on Mar. 23, 2012.

(51) Int. Cl.
 *G01V 1/28* (2006.01)
 *G01V 1/30* (2006.01)

(52) U.S. Cl.
 CPC ............... *G01V 1/308* (2013.01); *G01V 1/282* (2013.01); *G01V 1/28* (2013.01); *G01V 1/30* (2013.01); *G01V 2210/74* (2013.01)

(58) Field of Classification Search
 CPC ......... G01V 1/282; G01V 1/345; G01V 1/30; G01V 1/28; G01V 2210/74; G01V 1/308
 USPC ..................................... 367/73; 702/14, 16
 See application file for complete search history.

(56) References Cited

U.S. PATENT DOCUMENTS

| 4,467,461 | A |   | 8/1984 | Rice et al. |
|-----------|---|---|--------|-------------|
| 5,229,976 | A | * | 7/1993 | Boyd et al. ..................... 367/73 |
| 7,027,354 | B2 | * | 4/2006 | Cole et al. ..................... 367/73 |
| 7,424,367 | B2 | * | 9/2008 | Saltzer et al. .................. 367/73 |

(Continued)

FOREIGN PATENT DOCUMENTS

EP        0534648 A1    9/1992

OTHER PUBLICATIONS

International Search Report and Written Opinion of PCT Application Serial No. PCT/US2013/033655 dated Jul. 15, 2013.

*Primary Examiner* — Ian J Lobo

(57) ABSTRACT

A method for quantitative analysis of time-lapse seismic data of a reservoir, including: obtaining a plurality of compressional and shear velocities from a seismic inversion analysis; selecting a rock physics model based on a property of the reservoir; calculating a transform function using the rock physics model, where the transform function transforms variations in the plurality of compressional and shear velocities into variations in saturation and pore pressure; calculating a transform grid performing a domain transformation of the transform function; obtaining a plurality of cloud points from the seismic inversion analysis and the transform grid; and overlaying the plurality of cloud points onto the transform grid to estimate a plurality of reservoir parameters of the reservoir.

20 Claims, 13 Drawing Sheets

(56) References Cited

U.S. PATENT DOCUMENTS

| | | | |
|---|---|---|---|
| 7,516,016 B2* | 4/2009 | DeMartini et al. | 702/14 |
| 2005/0201203 A1 | 9/2005 | Goloshubin et al. | |
| 2009/0141587 A1 | 6/2009 | Welker et al. | |
| 2010/0142323 A1 | 6/2010 | Chu et al. | |
| 2011/0292767 A1* | 12/2011 | Dai | 367/73 |

* cited by examiner

QUANTITATIVE ANALYSIS OF TIME-LAPSE SEISMIC DATA

CROSS REFERENCE TO RELATED APPLICATIONS

This application claims the benefit of U.S. Provisional Patent Application Ser. No. 61/615,148 filed Mar. 23, 2012, which is incorporated herein by reference in its entirety.

BACKGROUND

Operations, such as geophysical surveying, drilling, logging, well completion, and production, are performed to locate and gather valuable downhole fluids. Surveys are often performed using acquisition methodologies, such as seismic mapping, resistivity mapping, etc., to generate images of underground formations. These formations are often analyzed to determine the presence of subterranean assets, such as valuable fluids or minerals, or to determine if the formations have characteristics suitable for storing fluids. Although the subterranean assets are not limited to hydrocarbons such as oil, throughout this document, the terms "oilfield" and "oilfield operation" may be used interchangeably with the terms "field" and "field operation" to refer to a site where any types of valuable fluids or minerals can be found and the activities required for extracting them. The terms may also refer to sites where substances are deposited or stored by injecting them into the surface using boreholes and the operations associated with this process. Further, the term "field operation" refers to a field operation associated with a field, including activities related to field planning, wellbore drilling, wellbore completion, and/or production using the wellbore.

SUMMARY

In general, in one aspect, the present disclosure relates to a method for quantitative analysis of time-lapse seismic data of a reservoir, the method includes obtaining a plurality of compressional and shear velocities from a seismic inversion analysis, selecting a rock physics model based on a property of the reservoir, calculating, by a computer processor, a transform function using the rock physics model, in which the transform function transforms variations in the plurality of compressional and shear velocities into variations in saturation and pore pressure, calculating, by the computer processor, a transform grid performing a domain transformation of the transform function, obtaining a plurality of cloud points from the seismic inversion analysis, and overlaying the plurality of cloud points onto the transform grid to estimate a plurality of reservoir parameters of the reservoir.

In general, in another aspect, the present disclosure relates to a system for quantitative analysis of time-lapse seismic data of a reservoir, the system including a computer processor, a data repository configured to store a plurality of compressional and shear velocities, and a quantitative analysis engine executing on the computer processor and configured to perform a seismic inversion analysis to obtain the plurality of compressional and shear velocities and store the plurality of compressional and shear velocities in the data repository. The quantitative analysis engine includes a rock physics modeler configured to select a rock physics model based on a property of the reservoir and calculate a transform function using the rock physics model, in which the transform function transforms variations in the plurality of compressional and shear velocities into variations in saturation and pore pressure. The quantitative analysis engine further includes a domain transformation module configured to calculate a transform grid performing a domain transformation of the transform function, obtain a plurality of cloud points from the seismic inversion analysis, and overlay the plurality of cloud points onto the transform grid to estimate a plurality of reservoir parameters of the reservoir.

In general, in yet another aspect, the present disclosure relates to a non-transitory computer-readable storage medium having a plurality of instructions for quantitative analysis of time-lapse seismic data of a reservoir, the plurality of instructions including functionality to obtain a plurality of compressional and shear velocities from a seismic inversion analysis, select a rock physics model based on a property of the reservoir, calculate a transform function using the rock physics model, wherein the transform function transforms variations in the plurality of compressional and shear velocities into variations in saturation and pore pressure, calculate a transform grid performing a domain transformation of the transform function, obtain a plurality of cloud points from the seismic inversion analysis, and overlay the plurality of cloud points onto the transform grid to estimate a plurality of reservoir parameters of the reservoir.

Other aspects of the disclosure will be apparent from the following description and the appended claims.

DETAILED DESCRIPTION

Figure 1:
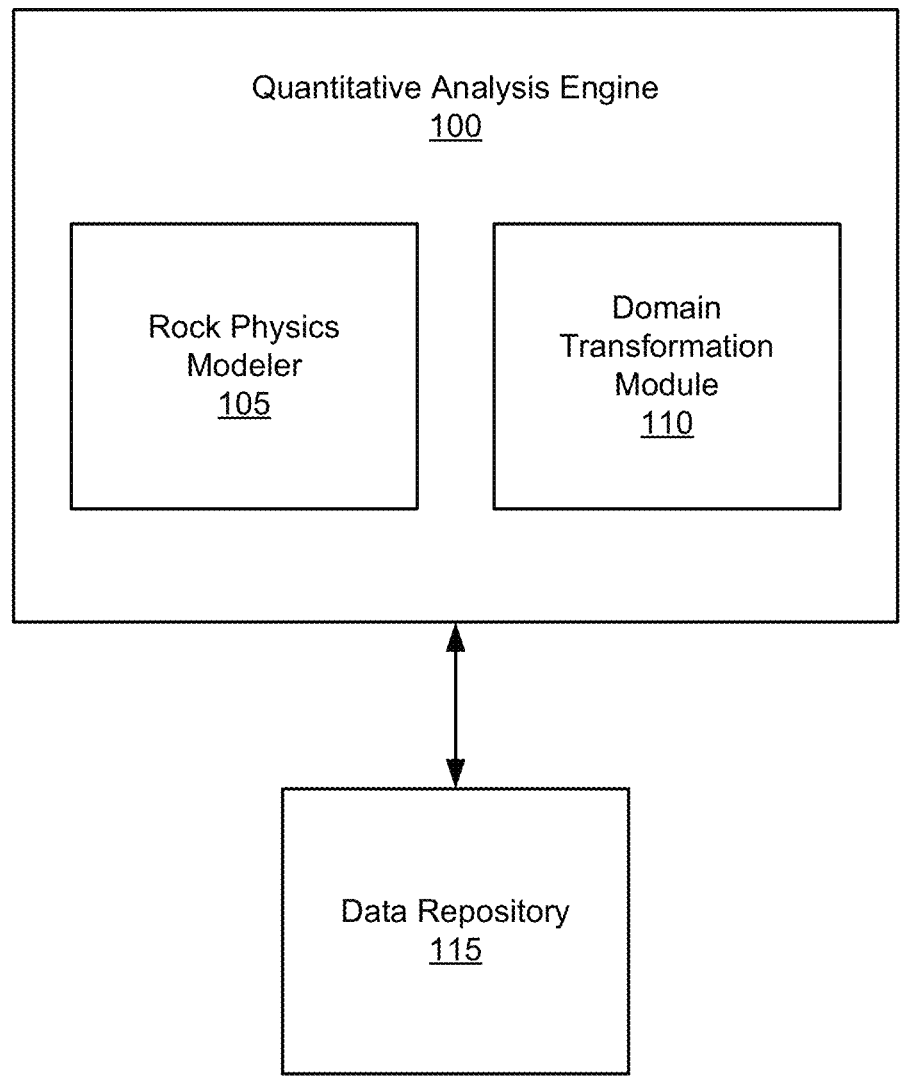
FIG. 1 shows a schematic diagram of a system in accordance with one or more embodiments of the present disclosure.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that the disclosed subject matter of the application may be practiced without these specific details. In other instances, well-known features have not been described in detail to avoid unnecessarily complicating the description.

In general, embodiments provide a system and method for quantitative analysis of time-lapse seismic data. Specifically, variations in compressional and shear velocities are calculated based on seismic data (e.g., using 4D seismic inversion). A rock physics model is chosen based on one or more reservoir conditions and/or injection methods. A transformation function is calculated using the selected rock physics model. Next, a transform grid is calculated transforming a regular grid in the $\Delta Pp$–$\Delta Sw$ domain into the $\Delta Vp$–$\Delta Vs$ domain. Lastly, domain inversion is used to estimate a set of reservoir parameters.

FIG. 1 shows a system (199) in accordance with one or more embodiments. As shown in FIG. 1, the system (199) includes components such as a quantitative analysis engine (100), a rock physics modeler (105), a domain transformation module (110), and a data repository (115). These components are described below and may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g., the Internet, a wide area network (WAN), or a local area network (LAN)), with wired and/or wireless segments. In one or more embodiments, there may be more than one quantitative analysis engine running on a device, as well as more than one rock physics modeler and/or domain transformation module with that component.

In one or more embodiments of the present disclosure, the quantitative analysis engine (100) is configured to analyze the amplitude variation among various surveys in a quantitative manner. The analysis may include transforming the measured variation of elastic parameters into the variation reservoir quantities. In one or more embodiments of the present disclosure, the quantitative analysis engine (100) combines a Petro Elastic Model (PEM) with vertical effective stress information to produce a dynamic model which can predict the variation of both pressure and fluid saturation from the variation of elastic properties.

In one or more embodiments of the present disclosure, the quantitative analysis engine (100) is configured to perform a quantitative time-lapse analysis comprising: (a) the development of a Rock Physics model and (b) the domain transformation of inverted seismic data.

1.1 Rock Physics Model

Figure 2A:
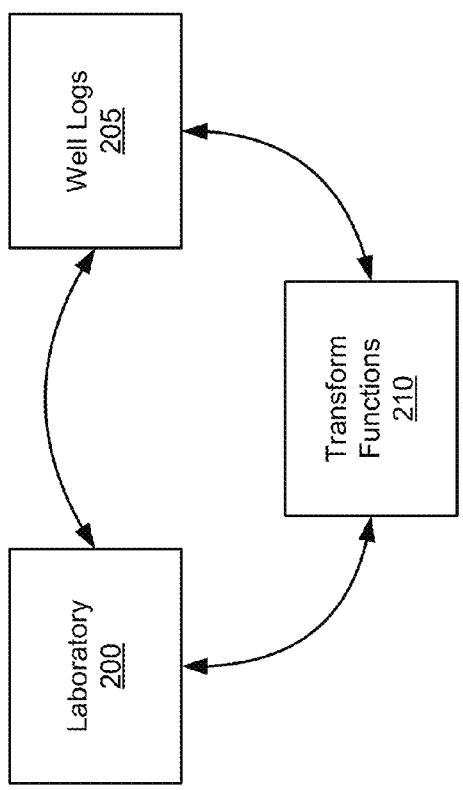
FIGS. 2A and 2B show data flow diagrams in accordance with one or more embodiments of the present disclosure.
Figure 2B:
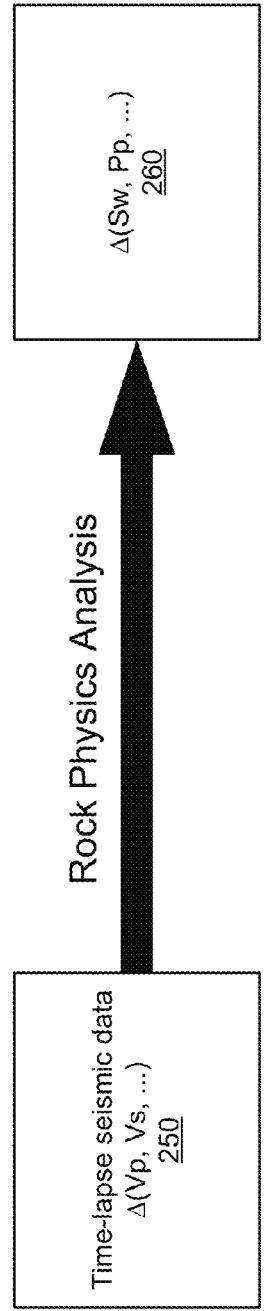

As depicted in FIGS. 2A and 2B, one of the major issues in planning and quantitative interpretation of time-lapse seismic data is quantification of the pressure and stress effects on seismic velocities.

In one or more embodiments of the present disclosure, the rock physics analysis provides the link between quantification of the pressure and stress effects on seismic velocities (see FIG. 2B).

In one or more embodiments of the present disclosure, the rock physics modeler (105) includes functionality to estimate the variation of pore-pressure ($\Delta Pp$) and water and gas saturation ($\Delta Sw$ and $\Delta Sg$) as a function of changes of compressional and shear velocities, ($\Delta Vp$ and $\Delta Vs$). Thus, in one or more embodiments of the present disclosure, a vector function $G: \mathbb{R}^3 \to \mathbb{R}^2$ establishes the following functional relationship:

$$\begin{cases} \Delta Pp = G_1(\Delta Vp, \Delta Vs) \\ \Delta Sw = G_2(\Delta Vp, \Delta Vs) \\ \Delta Sg = G_3(\Delta Vp, \Delta Vs) \end{cases} \quad (1)$$

This equation (1) can be summarized as $(\Delta Pp, \Delta Sw, \Delta Sg) = G(\Delta Vp, \Delta Vs)$. Simplification is needed to solve for the three unknowns $(\Delta Pp, \Delta Sw, \Delta Sg)$ based on two independent quantities $(\Delta Vp, \Delta Vs)$. The rock physics modeler (105) may be configured to perform one or more of the following simplifications: no changes in gas saturation ($\Delta Sg=0$) or no changes in water saturation ($\Delta Sw=0$). The first is convenient to model water injection as the main mechanism, where the second will help areas where gas is present.

1.1.1 Oil Water Rock Physics Model

In one or more embodiments of the present disclosure, the rock physics modeler (105) includes functionality to select an oil water rock physics model. The oil water rock physics model is consistent with the water injection mechanism without gas production. Thus, the rock physics modeler (105) may be configured to automatically select the oil water rock physics model based on seismic and/or well data indicating insignificant gas production or selection of a water injection mechanism. The rock physics modeler (105) may produce an estimation of pore-pressure and identify washout areas based on the oil water rock physics model. Mathematically, the oil water rock physics model assumes there is no change in gas saturation, meaning that equation (1) is simplified to $(\Delta Pp, \Delta Sw) = G(\Delta Vp, \Delta Vs)$.

In one or more embodiments of the present disclosure, the rock physics modeler (105), through the development of a rock physics model, includes functionality to establish the inverse transform, a vector function $F: \mathbb{R}^2 \to \mathbb{R}^2$ that takes into account the variation of pore pressure and water saturation to produce changes of compressional and shear velocities. Mathematically, this function establishes the following nonlinear equations:

$$\begin{cases} \Delta Vp = F_1(\Delta Pp, \Delta Sw) \\ \Delta Vs = F_2(\Delta Pp, \Delta Sw) \end{cases} \quad (2)$$

This equation (2) can be summarized as $(\Delta Vp, \Delta Vs) = F(\Delta Pp, \Delta Sw)$.

If F is invertible, this means that G can be constructed by inverting the function F, i.e., $G=F^{-1}$. However it is difficult to check if F is invertible and, in the positive case, it is difficult to compute it. This problem is addressed by the domain transformation module (110) (see Section 4.2).

A fundamental equation in the rock physics modeling is Gassmann's equation, which formulates the effect of fluids (oil, gas and water) in the seismic signal. However, Gassmann's equation does not represent the changes in velocity due to changes in effective stress. This is a factor since stress changes as a result of production and injection. Different stress paths will result in different seismic velocities. Laboratory core measurements may provide this link. However, laboratory core measurements are often taken in hydrostatic conditions very different from an actual stress path into the reservoir.

In one or more embodiments of the present disclosure, the rock physics modeler (105) includes functionality to consider the effect of effective stress changes on seismic velocities. The mechanical response of an elastic porous medium to changes of stress and pore pressure is described by Biot's effective stress (σ') in poroelastic theory. Effective stress is a macroscopic static concept from upscaling the microscopic force balance. In one or more embodiments of the present disclosure, the rock physics modeler (105) may be configured to represent this relationship using the following equation:

$$\sigma' = \sigma - \alpha Pp \quad (3)$$

where σ is total stress, Pp is pore pressure and α is Biot's effective stress coefficient. In one or more embodiments of the present disclosure, the rock physics modeler (105) may make the assumption that α=1 based on one or more predefined parameters.

In one or more embodiments of the present disclosure, the rock physics modeler (105) includes functionality to compute the vertical stress ($\sigma_V$) by integrating formation density. The pore pressure (Pp) has been measured in wells for the reservoir. The rock physics modeler (105) may be configured to obtain formation density from well logs, but may also be configured to use core density as an alternative.

Figure 3:
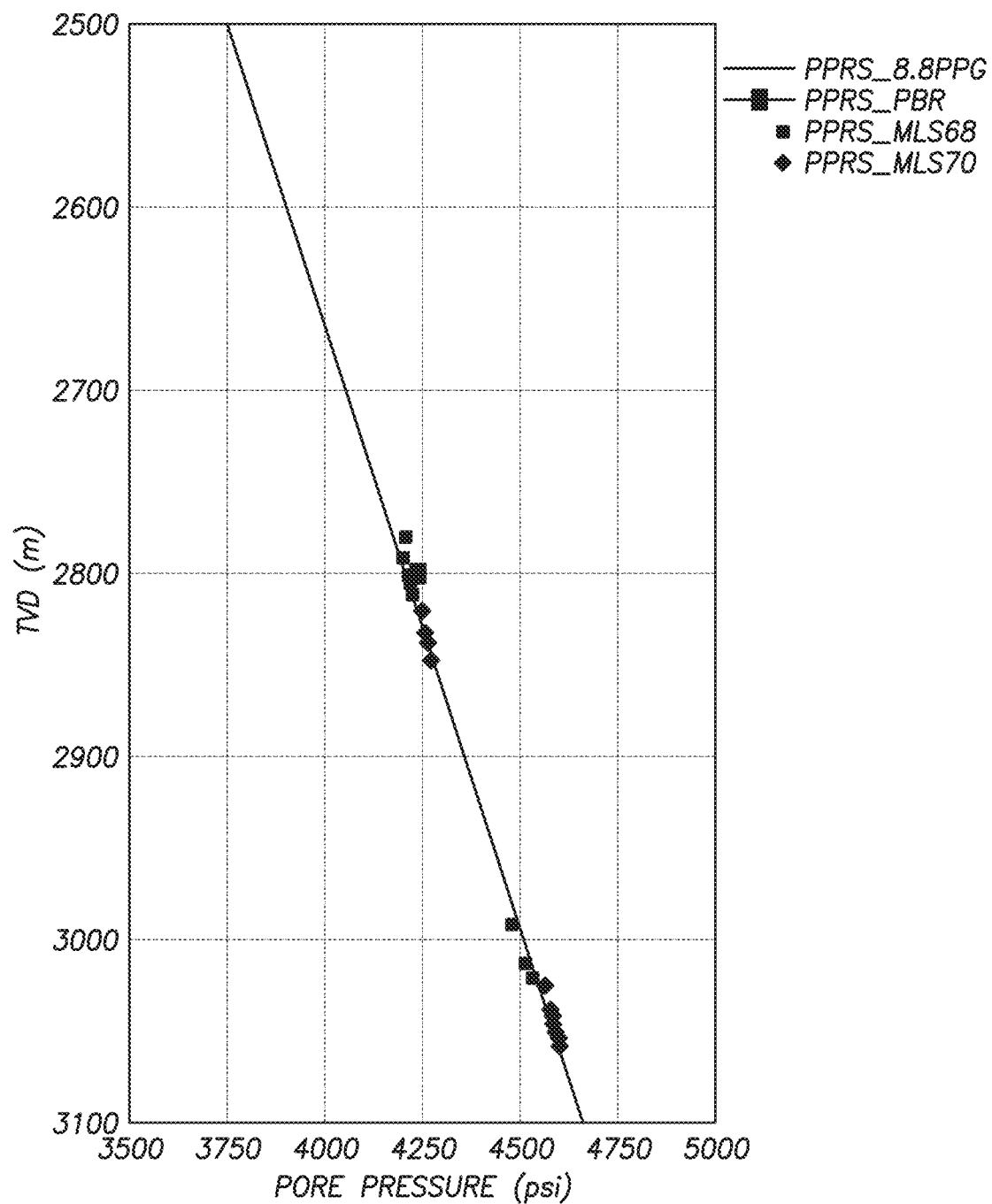
FIG. 3 shows example graph of pore pressure measurements in accordance with one or more embodiments of the present disclosure.

FIG. 3 shows example pore pressure measurements of two wells. In the example of FIG. 3, initial pore pressure is consistent with the equivalent hydrostatic pressure of 8.8 ppg. In this example, the rock physics modeler (105) extrapolates intervals of missing or poor log quality using formation laws built locally. More specifically they are:

$$Pp = 0.1704 \times 8.8 \times TVD \quad (4)$$

$$\sigma_V = 1.4233 \times [0.003275 \times TVDBML^{1.6367} + 1.8 \times TVDBML + 1.03 \times WD] \quad (5)$$

where Pp is the Oligo-Miocene reservoir pressure (psi), $\sigma_V$ is the total vertical stress (psi), TVDBML is true vertical depth below mudline (m), WD is the water depth (m) and AG is the air gap (m). Note that the quantity TVDBML=TVD−WD−AG is the measured depth below seabed. Given these two quantities, the vertical effective stress ($\sigma_V$) is given by $\sigma'_V = \sigma_V - Pp$, which is the main independent quantity upon which some others reservoir physical parameters are constructed, such as the density, compressional and shear velocities, and porosity. Compaction is considered based on an empirical rock physics model to derive reservoir properties as a function of vertical effective stress. This model was developed based on direct measurement on the available wells in the area that follow the actual stress path into the reservoir. More specifically, in this example, they are given by the following equations:

$$\rho_{dry} = \rho_{ref} \times \exp[k \times (\sigma'_V - 1700)] \quad (6)$$

$$\phi = \phi_{ref} \times \exp[k \times (\sigma'_V - 1700)] \quad (7)$$

$$V_{P,(dry)} = 3.65 \times [1 - 0.698 \times \exp(\sigma'_V / 2500)] \quad (8)$$

$$V_{S,(dry)} = 1.75 \times [1 - 0.346 \times \exp(\sigma'_V / 1150)] \quad (9)$$

These relationships were obtained specifically for the analyzed data of the aforementioned example.

In one or more embodiments of the present disclosure, the rock physics modeler (105) includes functionality to calculate the bulk modulus ($K_{dry}$) and shear modulus ($G_{dry}$), given by $$K_{dry} = \rho_{dry} \left( V_{P,(dry)}^2 - \frac{4}{3} V_{S,(dry)}^2 \right) \quad (10)$$

$$G_{dry} = \rho_{dry} V_{S,(dry)}^2 \quad (11)$$

In one or more embodiments of the present disclosure, the rock physics modeler (105), using equations (4)-(10), includes functionality to define the vector function F by performing the following:

Definition of vector function F that gives the variation of elastic parameters as a function of the variation of reservoir parameters $(\Delta V_p, \Delta V_s) = F(\Delta P_p, \Delta S_w)$:

1. Let $\Delta P_p, \Delta S_w$ be the input data
2. Define $P_{p,f} = P_{p,i} + \Delta P_p$, where $P_{p,i}$ is given by equation (4)
3. Define $S_{w,f} = S_{w,i} + \Delta S_w$, where $S_{w,i}$ is 0.2
4. Compute $\sigma'_{v,f} = \sigma_{v,f} - P_{p,f}$, where $\sigma_{v,f}$ is given by equation (5)
5. Compute $P_{dry}, \phi, V_{P,(dry)},$ and $V_{S,(dry)}$ using equations (6)-(9)
6. Compute $K_{dry}$ and $G_{dry}$ using equations (10)-(11)
7. Use Biot-Gassmann's equations to compute $K_{sat}$ and $G_{sat}$
8. Compute, $V_{P,sat}$ and $V_{S,sat}$ using equations (10)-(11), in which the subscript dry is changed to sat.
9. Compute $\Delta V_p = V_{P,sat} - V_{P,ini}$ and $\Delta V_s = V_{S,sat} - V_{S,ini}$, where $V_{P,ini}$ and $V_{S,ini}$ are computed through 2 to 8, with $\Delta P_p = 0$ and $\Delta S_w = 0$

1.2 Domain Inversion

As shown above, in one or more embodiments of the present disclosure, the rock physics modeler (105) calculates a function F that transforms the variation in saturation and pore pressure into variation in compressional and shear velocities, i.e., $(\Delta V_p, \Delta V_s) = F(\Delta P_p, \Delta S_w)$.

In one or more embodiments of the present disclosure, the domain transformation module (110) calculates a function G that performs the inverse transformation. If F is invertible, this means that G can be constructed by inverting the function F, i.e., $G = F^{-1}$. Although it is very hard to check whether a nonlinear vector function is invertible, one way to do it, at least locally in an open set $I \subset \mathbb{R}^2$, is by verifying if the Jacobian matrix is non-singular inside I.

However, even F is locally invertible in set I, it can be very hard, even impossible, to algebraically compute its analytic inverse G. To solve this problem, in one or more embodiments of the present disclosure, the domain transformation module (110) numerically inverts F by utilizing a domain transformation together with 2D Taylor expansion.

1.2.1 Domain Transformation

In one or more embodiments of the present disclosure, the domain transformation module (110) includes functionality to construct the domain transformation by performing the following.

Construction of the Transformed Grid

For each $\Delta P_p$ in a predefined range (e.g., [−3500, 1000] for the example of FIG. 3, discussed above)

For each $\Delta S_w$ in a predefined range (e.g., [−0.2, 0.8] for the example of FIG. 3, discussed above)

Compute the pair $(\Delta V_p, \Delta V_s)$ using the function F (built in Algorithm 1)

Figure 4:
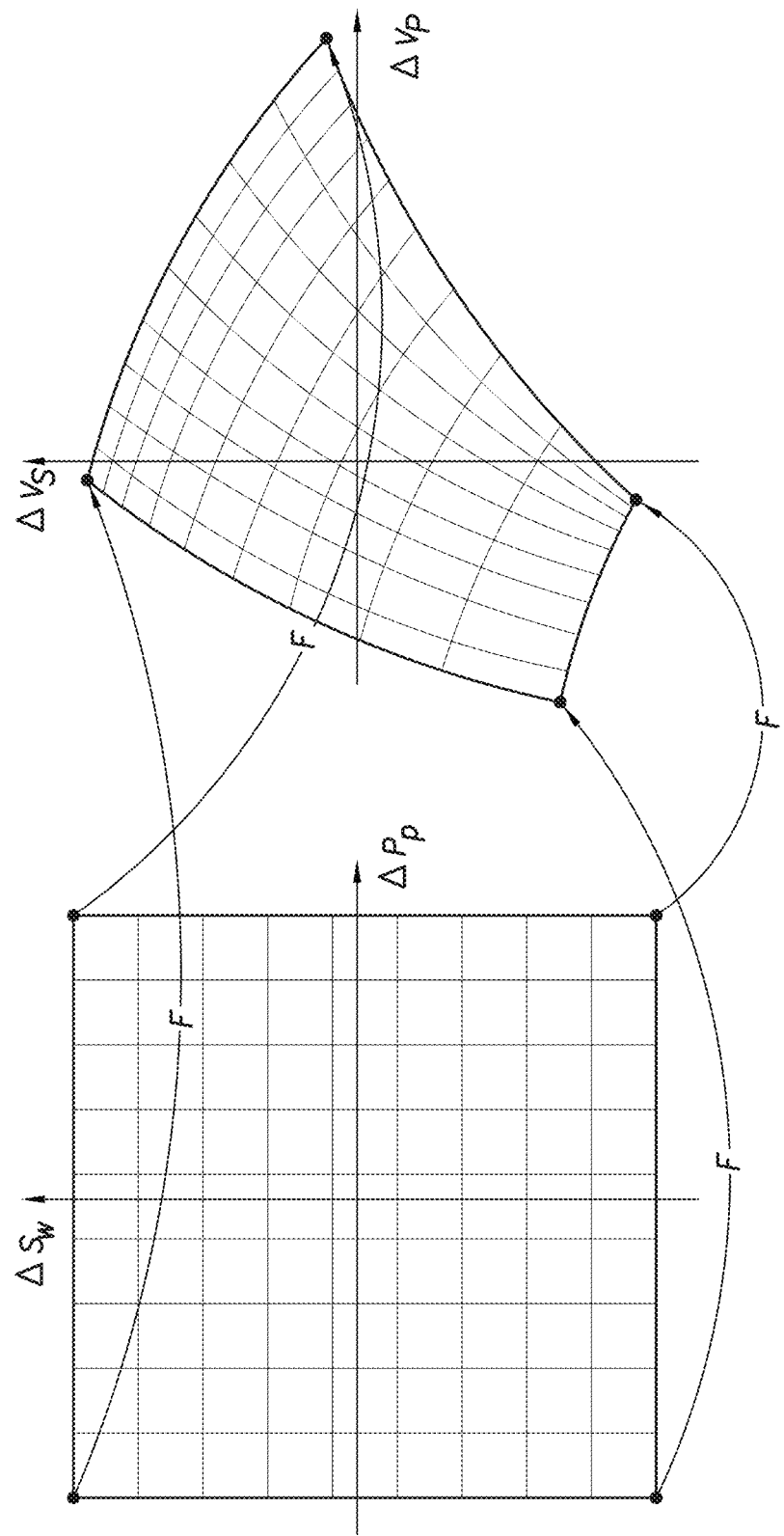
FIG. 4 shows an example domain transformation from a regular Cartesian grid to a non-Cartesian grid in accordance with one or more embodiments of the present disclosure.

The predefined range values in the construction of the transformed grid depend on the corresponding reservoir and may differ from the example given. In summary, the domain transformation module (110) is configured to produce a transformation of a regular grid in the $\Delta P_p - \Delta S_w$ domain into the $\Delta V_p - \Delta V_s$ domain, which can be exemplified in FIG. 4.

1.2.2 Grid Interpolation Through 2D Taylor Expansion

In one or more embodiments of the present disclosure, the domain transformation module (110), in order to simplify the mathematical derivation, is configured to utilize the auxiliary variables x, y, u, and v by means of $$\begin{cases} x = \Delta Vp \\ y = \Delta Vs \end{cases} \text{ and } \begin{cases} u = \Delta Pp \\ v = \Delta Sw \end{cases}$$

In the previous section, through the development of the rock physics model, the function $F=(f_1, f_2)$ was defined as follows:

$$\begin{cases} x = f_1(u, v) \\ y = f_2(u, v) \end{cases}$$

The function $G=(g_1, g_2)$ is defined as follows:

$$\begin{cases} u = g_1(x, y) \\ v = g_2(x, y) \end{cases}$$

In one or more embodiments of the present disclosure, the domain transformation module (110) includes functionality to apply Taylor expansion to the variables u and v, around $x_0$ and $y_0$, yielding $$\begin{cases} u = u_0 + \frac{\partial g_1}{\partial x}(x - x_0) + \frac{\partial g_1}{\partial y}(y - y_0) \\ v = v_0 + \frac{\partial g_2}{\partial x}(x - x_0) + \frac{\partial g_2}{\partial y}(y - y_0) \end{cases}$$

In matrix notation:

$$\begin{pmatrix} u \\ v \end{pmatrix} = \begin{pmatrix} u_0 \\ v_0 \end{pmatrix} + G' \begin{pmatrix} x - x_0 \\ y - y_0 \end{pmatrix} \quad (12)$$

where G' is a 2×2 matrix, called Jacobian matrix of vector function G. In order to find G', vector calculus establishes that $G'=[F']^{-1}$, where F' is the Jacobian matrix of vector function F.

Figure 5:
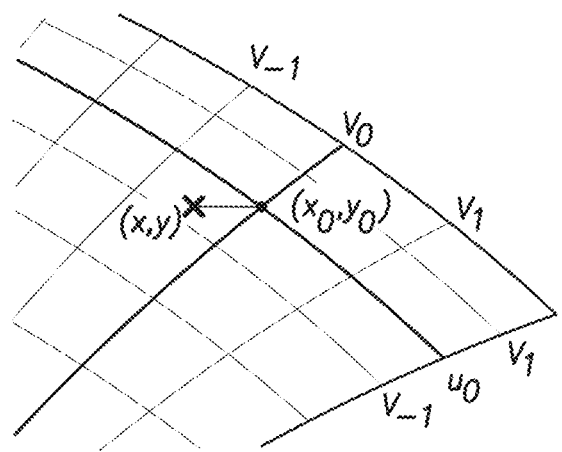
FIG. 5 shows an example estimation of grid interpolation variables u and v in accordance with one or more embodiments of the present disclosure.

Therefore, in one or more embodiments of the present disclosure, in order to find the values u and v, the domain transformation module (110) selects the coordinates $x_0$ and $y_0$, that are the closest one to the given values x and y. As shown in FIG. 5, the coordinates $x_0$ and $y_0$ denoted by a point are the closest values to the given values x and y denoted by the 'x.' The domain transformation module (110) then collects the values $u_0$ and $v_0$, as shown in FIG. 5, and the Jacobian matrix F', associated to $x_0$ and $y_0$. By computing G, by numerically inverting F', the domain transformation module (110) then applies the equation (2) to compute an estimate of u and v.

Figure 6:
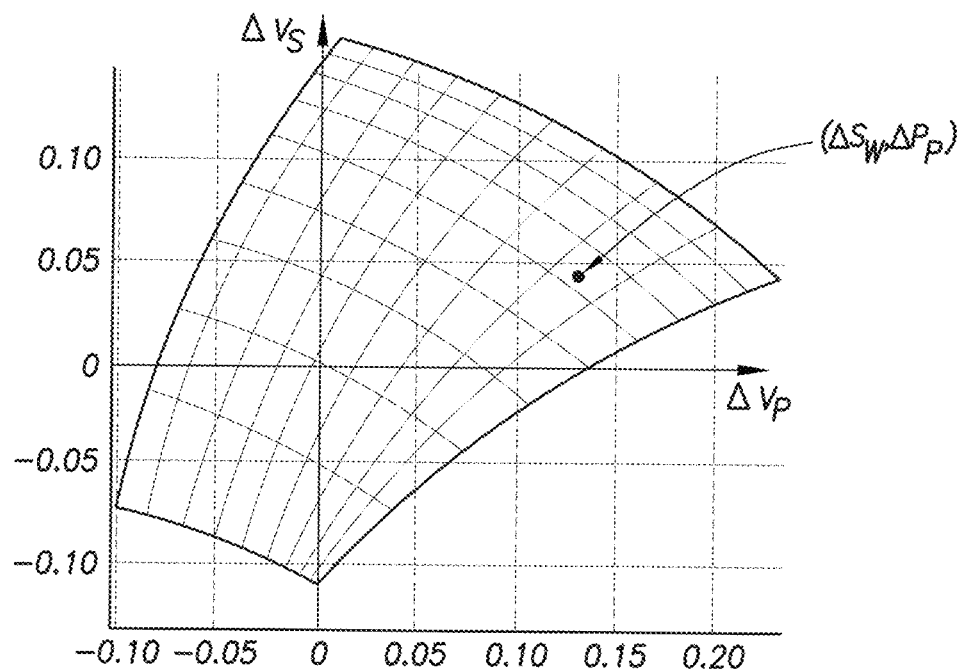
FIG. 6 shows an example transform grid domain overlaid with a point cloud in accordance with one or more embodiments of the present disclosure.

In one or more embodiments of the present disclosure, in order to use the proposed method for the output data of a 4D seismic inversion, the domain transformation module (110) produces a cloud point from the 4D seismic inversion and the transform grid, using rock physics, as shown in FIG. 6. Then, the domain transformation module (110) overlays the cloud points onto the transform grid and for each point, estimates the reservoir parameters.

As shown, for example, in FIG. 6, the points outside the transform grid domain indicate that the used theoretical model is not appropriate. They correspond to the induce fracture above injector (compaction X tensile failure) and gas cap above producer. They may be numerically assigned to Not-A-Number value and only those points that fall within the transform grid, as shown in FIG. 6, may be appropriate.

In one or more embodiments of the present disclosure, the data repository (115) is a database or storage application residing in one or more servers. For example, the data repository (115) may be a distributed database management system (DBMS) (or a component thereof), a clustered database, a standalone flat file, and/or any storage software residing on one or more physical storage devices. Examples of a storage device may include, but are not limited to, a hard disk drive, a tape drive, a redundant array of independent disks (RAID), and/or a solid state drive or memory device. Any type of database or storage application can be used, in accordance with various embodiments of the present disclosure.

In one or more embodiments of the present disclosure, the data repository (115) includes functionality to store seismic inversion data, well data, quantitative analysis data, one or more rock physics models, intermediate data, and/or any other data utilized in the quantitative analysis of time-lapse data, in accordance with various embodiments of the present disclosure.

Figure 7:
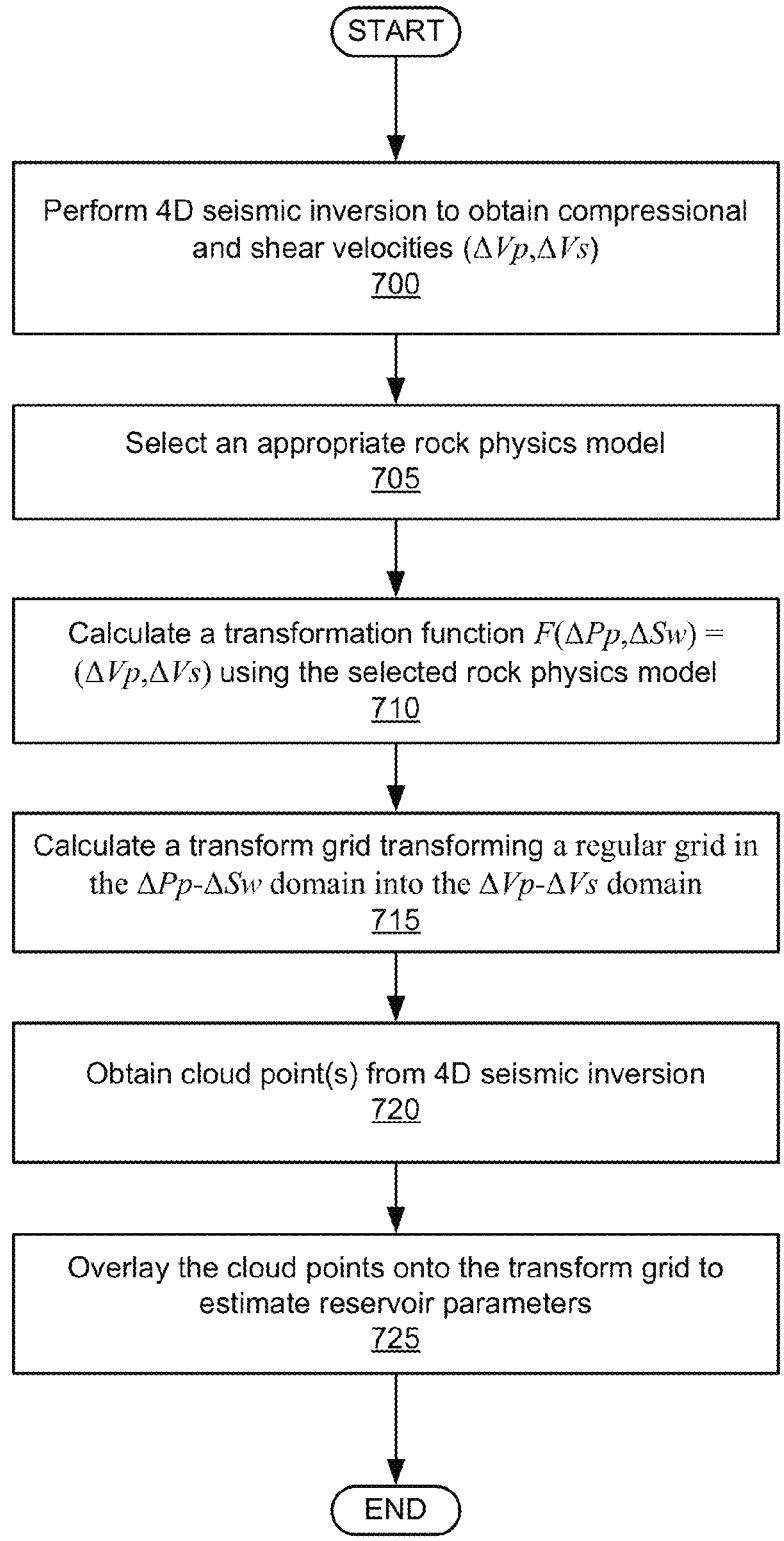
FIG. 7 shows a flowchart in accordance with one or more embodiments of the present disclosure.

FIG. 7 show a flowchart in accordance with one or more embodiments. The process shown in FIG. 7 may be used, for example, with the system of FIG. 1, to perform a quantitative analysis of time-lapse seismic data. The sequence shown in FIG. 7 may differ among embodiments, and one or more of the elements may be performed in parallel and/or may be optional. Accordingly, the scope should not be considered limited to the specific arrangement of elements shown in FIG. 7.

In box 700, in one or more embodiments of the present disclosure, a seismic inversion is performed to obtained compressions and shear velocities ($\Delta Vp, \Delta Vs$).

In box 705, in one or more embodiments of the present disclosure, an appropriate rock physics model is selected. The rock physics model may be selected by a user of a quantitative analysis engine (e.g., quantitative analysis engine (100) of FIG. 1, discussed above) or by a user, in accordance with various embodiments of the present disclosure. The rock physics model may include one or more of the following simplifications: no changes in gas saturation ($\Delta Sg=0$) or no changes in water saturation ($\Delta Sw=0$). The appropriate model may be selected based on the injection mechanism and/or the presence of one or more properties such as gas.

In box 710, in one or more embodiments of the present disclosure, a transformation function $F(\Delta Pp, \Delta Sw)=(\Delta Vp, \Delta Vs)$ is calculated using the selected rock physics model. In box 715, in one or more embodiments of the present disclosure, a transform grid transforming a regular grid in the $\Delta Pp$–$\Delta Sw$ domain into the $\Delta Vp$–$\Delta Vs$ domain is calculated.

In box 720, in one or more embodiments of the present disclosure, cloud point(s) are obtained from the seismic inversion analysis. In box 725, in one or more embodiments of the present disclosure, the cloud points are overlaid onto the transform grid to estimate reservoir parameters.

1.3 Examples

The following section describes various examples of the present disclosure. The examples are included to aid in the understanding of the present disclosure but are not intended to limit the scope of the present disclosure.

In a first example, the proposed analysis was performed with the seismic data in block 7 between the base and top reservoir markers, given by interpreted surfaces 05 and 06, respectively, of a 3D repository model. More specifically six horizons were selected: the first one as the top reservoir and the others being parallel to it, each one two meters below the previous one. Therefore the second horizon is two meters below the top reservoir; the third is four meters below, and so on, until the sixth horizon which is ten meters below the top reservoir.

For a given horizon, each single pixel is selected by providing variation of Vp and Vs as well as its TVD and WD value. The ΔVp and ΔVs values are considered as input, while their TVD and WD values are used to construct the transform grid together with the selected rock physics model. Using the method described in the previous section, the ΔVp and ΔVs values are then transformed into ΔPp and ΔSw for the current pixel. This procedure is repeated for each pixel in the horizon, therefore generating two new properties on the current horizon: the variation of saturation and pore pressure.

During the mapping procedure some pairs of ΔVp and ΔVs don't fall into the transformation grid, meaning that this variation is not explained by the proposed rock physics model. Therefore this variation is mapped into an undefined number, explaining the existence of regions without values in the saturation and pore pressure maps.

Figure 8A:
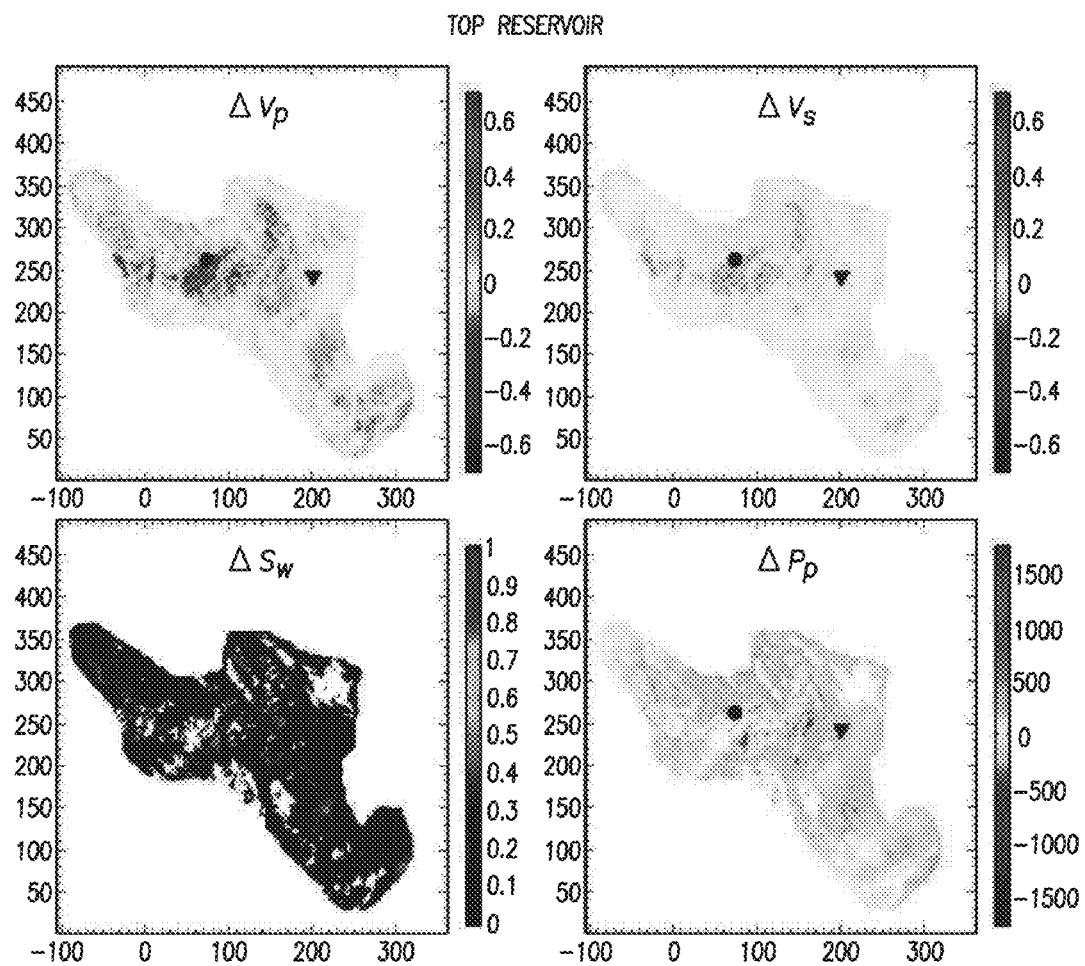
FIGS. 8A-8F show examples of changes in compressional and shear velocities, saturation, and pore pressure in a reservoir in accordance with one or more embodiments of the present disclosure.
Figure 8B:
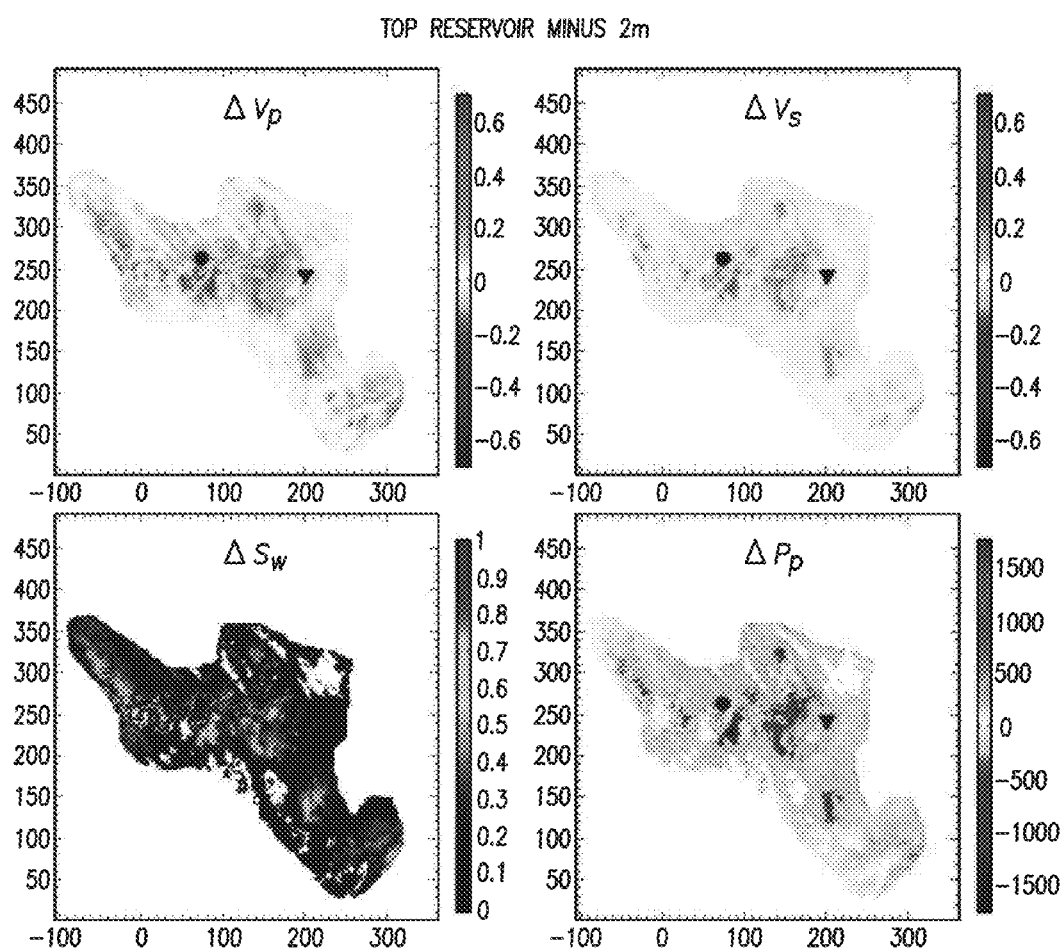
Figure 8C:
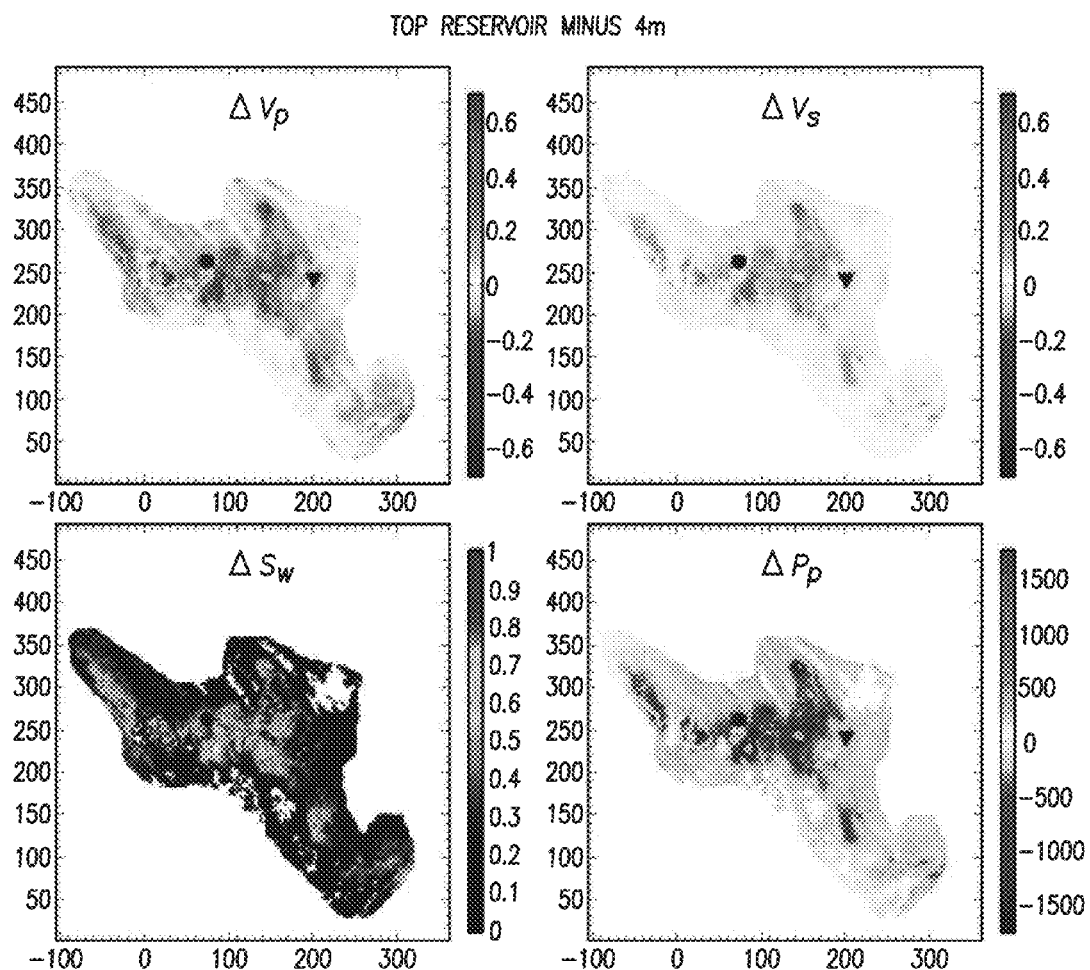
Figure 8D:
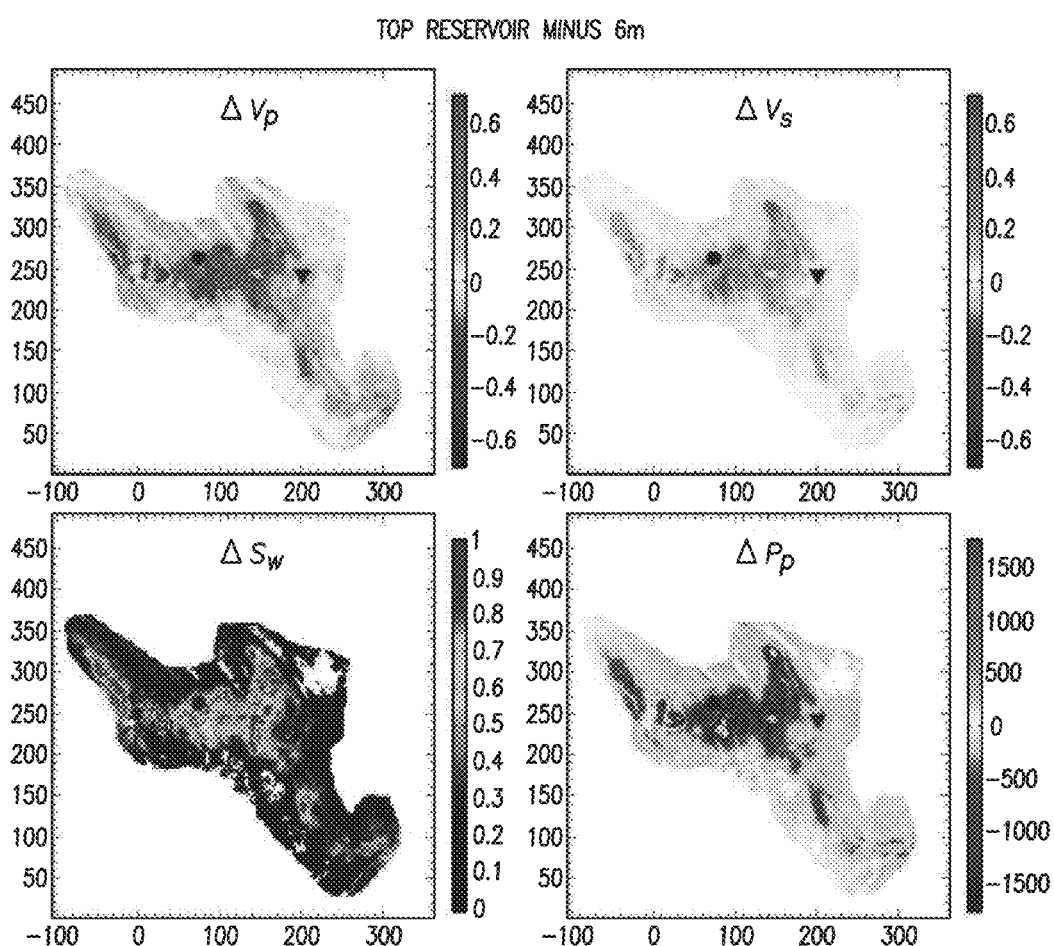
Figure 8E:
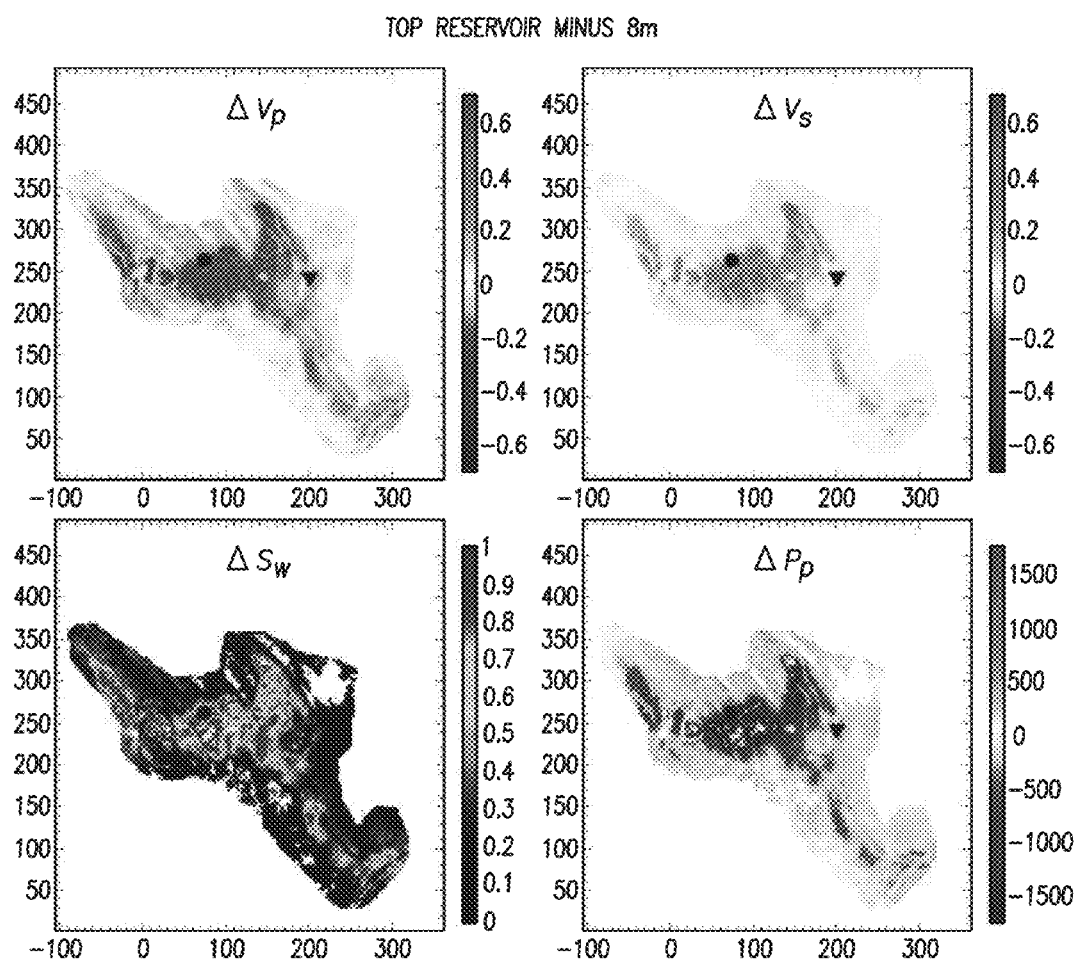
Figure 8F:
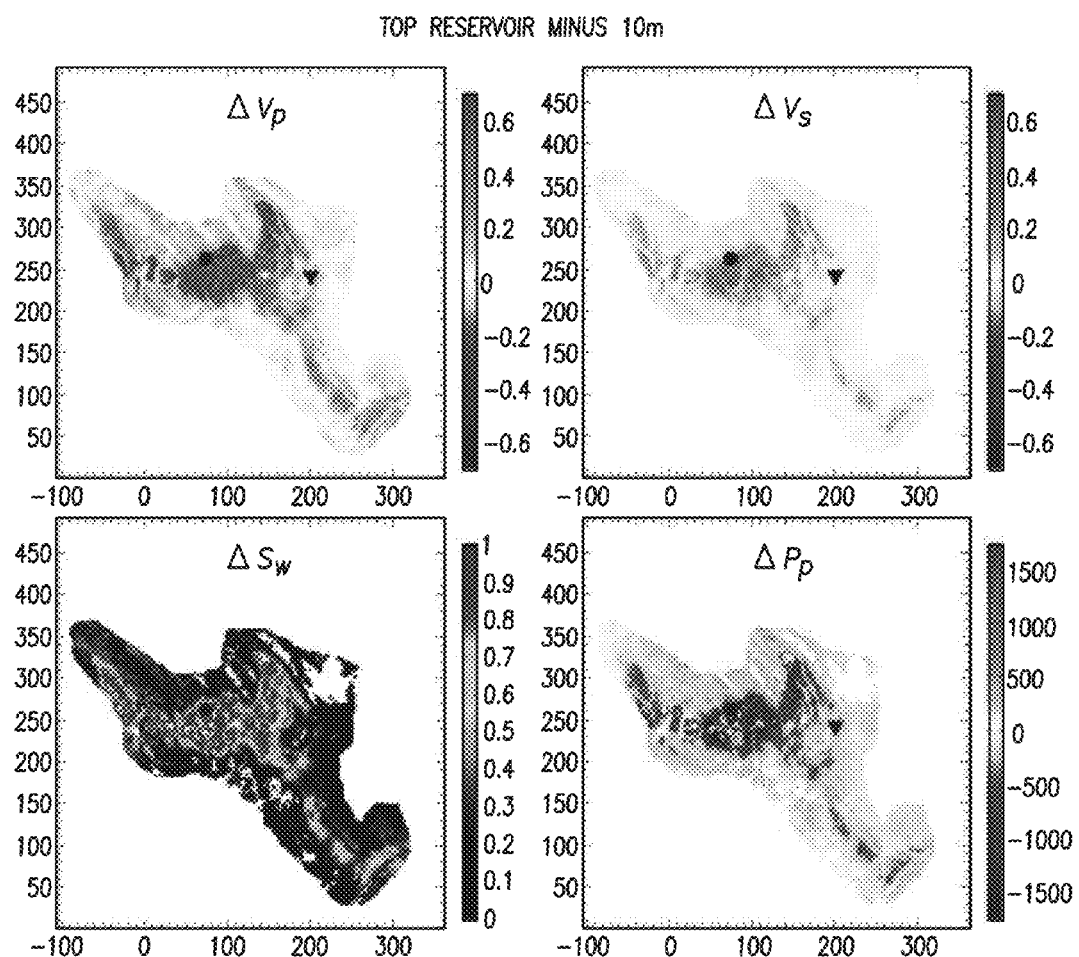

This example can be summarized with the help of FIGS. 8A-8F, where each one of the six horizons is analyzed. FIGS. 8A and 8B show the result for the top reservoir and FIGS. 8E and 8F show the result for the horizons 10 meters below the reservoir. In the top reservoir there is no water, while the pressure has slightly increased. Deeper in the reservoir, the water saturation increases while the pressure shows progressive decreasing values, especially in the region between the producer (circle) and injector (triangle) well. This indicates that the reservoir has been flooded with water, entering into a depletion regime.

Based on the integration of Geophysics, Geomechanics, and Rock Physics, a reliable solution for reservoir monitoring was developed. In a first approach, Geophysical time-lapse data may be inverted by a 4D AVO ISIS inversion method in order to generate a 3D model as well as the variation of elastic parameters. In a second approach, a more complete petroelastic model may be developed with the combination of a rock physics model considering Biot-Gassmann for the saturation effects and the vertical effective stress for the pore pressure effects. In one or more embodiments of the present disclosure, by combining both approaches, a reservoir management tool may:

Predict pressure and saturation changes
Locate bypassed and undrained oil
Optimize infill well locations and flood patterns
Reduce risks for fault reactivation.

Understanding of the various potential processes and ability to predict and monitor field behavior is useful to the management of the reservoir for increased productivity and recovery. Fluid flow is thus directly mapped by the seismic data rather than solely predicted by the reservoir simulation.

Figure 9:
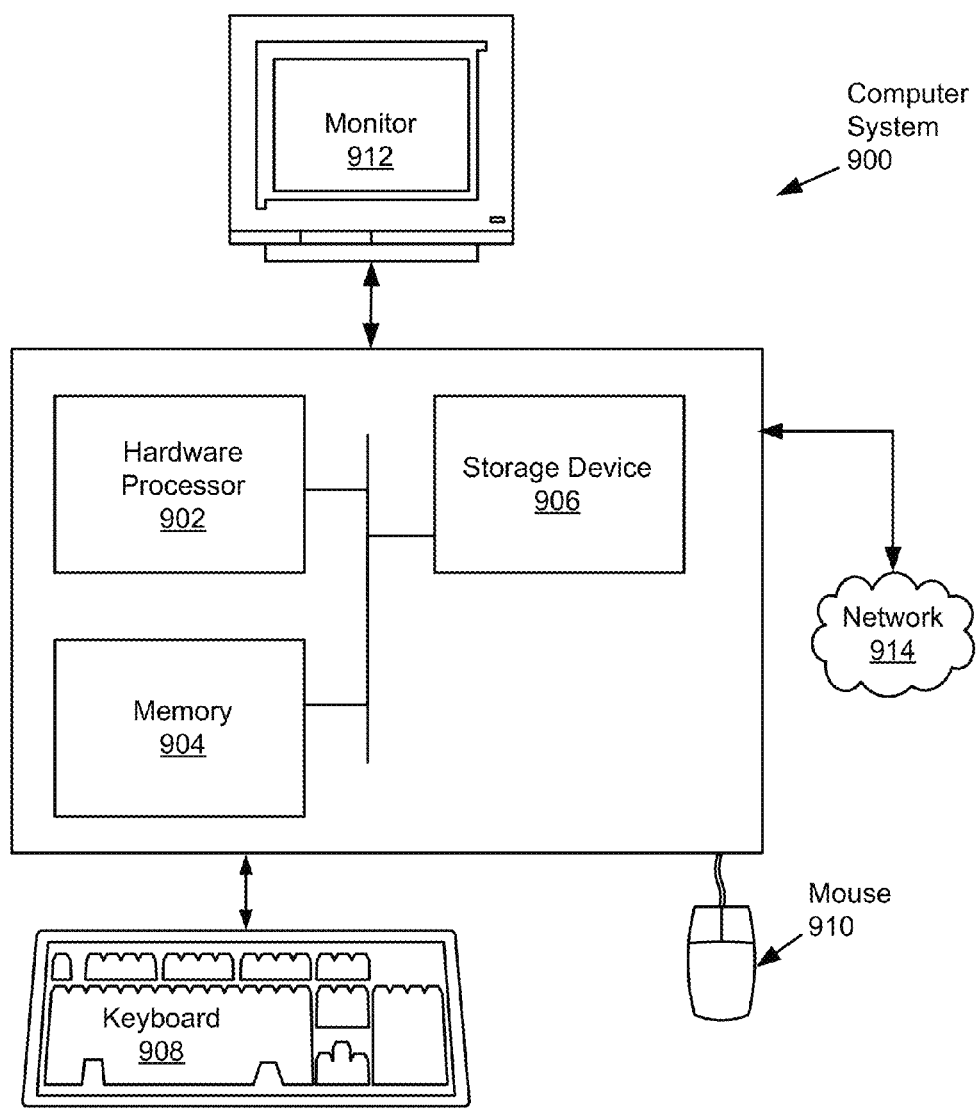
FIG. 9 shows a computer system in accordance with one or more embodiments of the present disclosure.

Embodiments may be implemented on virtually any type of computer regardless of the platform being used. For example, as shown in FIG. 9, a computer system (900) includes one or more processor(s) (902), an associated memory (904) (e.g., random access memory (RAM), cache memory, flash memory, etc.), a storage device (906) (e.g., a hard disk, an optical drive such as a compact disk drive or digital video disk (DVD) drive, a flash memory stick, etc.), and numerous other elements and functionalities of today's computers (not shown). In one or more embodiments, the processor (902) is hardware. For example, the processor may be an integrated circuit. The computer system (900) may also include input means, such as a keyboard (908), a mouse (910), or a microphone (not shown). Further, the computer system (900) may include output means, such as a monitor (912) (e.g., a liquid crystal display (LCD), a plasma display, or cathode ray tube (CRT) monitor). The computer system (900) may be connected to a network (914) (e.g., a local area network (LAN), a wide area network (WAN) such as the Internet, or any other type of network) via a network interface connection (not shown). In one or more embodiments, many different types of computer systems exist, and the aforementioned input and output means may take other forms. Generally speaking, the computer system (900) includes at least the minimal processing, input, and/or output means to practice embodiments.

Further, in one or more embodiments, one or more elements of the aforementioned computer system (900) may be located at a remote location and connected to the other elements over a network. Further, embodiments may be implemented on a distributed system having a plurality of nodes, where each portion (e.g., quantitative analysis engine, rock physics modeler, domain transformation module) may be located on a different node within the distributed system. In one embodiment, the node corresponds to a computer system. Additionally, the node may correspond to a processor with associated physical memory. The node may also correspond to a processor or micro-core of a processor with shared memory and/or resources. Further, software instructions in the form of computer readable program code to perform embodiments may be stored, temporarily or permanently, on a non-transitory computer readable storage medium, such as a compact disc (CD), a diskette, a tape, memory, or any other computer readable storage device.

While the present disclosure has been described with respect to a limited number of embodiments, those skilled in the art, having benefit of this disclosure, will appreciate that other embodiments can be devised which do not depart from the scope as disclosed herein. Accordingly, the scope should not be limited by this description.

What is claimed is:

1. A method for managing a reservoir in a field comprising subterranean formations, comprising:
    obtaining time-lapse seismic data of the reservoir;
    obtaining a plurality of compressional and shear velocities from a seismic inversion analysis of the time-lapse seismic data;
    selecting a rock physics model based on a property of the reservoir;
    calculating, by a computer processor, a transform function using the rock physics model, wherein the transform function transforms variations in the plurality of compressional and shear velocities into variations in saturation and pore pressure;
    calculating, by the computer processor, a transform grid performing a domain transformation of the transform function;
    obtaining a plurality of cloud points from the seismic inversion analysis and the transform grid; and
    overlaying the plurality of cloud points onto the transform grid to estimate a plurality of reservoir parameters of the reservoir,
    wherein the plurality of reservoir parameters is used to determine an adjustment of a field operation to manage a recovery of fluids from the reservoir.

2. The method of claim 1, wherein calculating the transform grid comprises:
    calculating an inverse of the transform function by performing a Taylor expansion of the variations in saturation and pore pressure.

3. The method of claim 1, wherein calculating the transform function comprises:
  computing the vertical effective stress of the reservoir given by:

$$\sigma'_V = \sigma_V - Pp$$

wherein Pp is pore pressure, $\sigma_V$ is total vertical stress, and $\sigma'_V$ is the vertical effective stress.

4. The method of claim 1, wherein calculating the transform function comprises:
  computing the variations in the plurality of compressional and shear velocities using the Biot-Gassman's equations.

5. The method of claim 1, wherein the plurality of reservoir parameters includes at least two of compaction, density, compressional velocity, shear velocity, and porosity.

6. The method of claim 1, wherein selecting the rock physics model is based on an injection method.

7. The method of claim 1, wherein the rock physics model assumes no change in gas saturation or no change in water saturation.

8. A system for managing a reservoir in a field comprising a plurality of subterranean formations, comprising:
  a computer processor;
  a data repository configured to store a plurality of compressional and shear velocities obtained by performing a seismic inversion analysis of time-lapse seismic data of the reservoir;
  a rock physics modeler executing on the computer processor and configured to:
    select a rock physics model based on a property of the reservoir, and
    calculate a transform function using the rock physics model, wherein the transform function transforms variations in the plurality of compressional and shear velocities into variations in saturation and pore pressure;
  a domain transformation module configured to:
    calculate a transform grid performing a domain transformation of the transform function,
    obtain a plurality of cloud points from the seismic inversion analysis and the transform grid, and
    overlay the plurality of cloud points onto the transform grid to estimate a plurality of reservoir parameters of the reservoir,
  wherein the plurality of reservoir parameters is used to determine an adjustment of a field operation to manage a recovery of fluids from the reservoir.

9. The system of claim 8, wherein the domain transformation module is further configured to calculate the transform grid by:
  calculating an inverse of the transform function by performing a Taylor expansion of the variations in saturation and pore pressure.

10. The system of claim 8, wherein the rock physics modeler is further configured to calculate the transform function by:
  computing the vertical effective stress of the reservoir given by:

$$\sigma'_V = \sigma_V - Pp$$

wherein Pp is pore pressure, $\sigma_V$ is total vertical stress, and $\sigma'_V$ is the vertical effective stress.

11. The system of claim 8, wherein the rock physics modeler is further configured to calculate the transform function by:
  computing the variations in the plurality of compressional and shear velocities using the Biot-Gassman's equations.

12. The system of claim 8, wherein the plurality of reservoir parameters includes at least two of compaction, density, compressional velocity, shear velocity, and porosity.

13. The system of claim 8, wherein selecting the rock physics model is based on an injection method.

14. The system of claim 8, wherein the rock physics model assumes no change in gas saturation or assumes no change in water saturation.

15. A non-transitory computer-readable storage medium comprising a plurality of instructions for managing a reservoir in a field comprising a plurality of subterranean formations, the plurality of instructions comprising functionality to:
  obtaining time-lapse seismic data of the reservoir;
  obtain a plurality of compressional and shear velocities from a seismic inversion analysis of the time-lapse seismic data;
  select a rock physics model based on a property of the reservoir;
  calculate a transform function using the rock physics model, wherein the transform function transforms variations in the plurality of compressional and shear velocities into variations in saturation and pore pressure;
  calculate a transform grid performing a domain transformation of the transform function;
  obtain a plurality of cloud points from the seismic inversion analysis and the transform grid; and
  overlay the plurality of cloud points onto the transform grid to estimate a plurality of reservoir parameters of the reservoir,
  wherein the plurality of reservoir parameters are used to determine an adjustment of a field operation to manage a recovery of fluids from the reservoir.

16. The non-transitory computer-readable storage medium of claim 15, wherein the instructions to calculate the transform grid comprises functionality to:
  calculate an inverse of the transform function by performing a Taylor expansion of the variations in saturation and pore pressure.

17. The non-transitory computer-readable storage medium of claim 15, wherein the instructions to calculate the transform function comprises functionality to:
  compute the vertical effective stress of the reservoir given by:

$$\sigma'_V = \sigma_V - Pp$$

wherein Pp is pore pressure, $\sigma_V$ is total vertical stress, and $\sigma'_V$ is the vertical effective stress.

18. The non-transitory computer-readable storage medium of claim 15, wherein the plurality of reservoir parameters includes at least two of compaction, density, compressional velocity, shear velocity, and porosity.

19. The non-transitory computer-readable storage medium of claim 15, wherein selecting the rock physics model is based on an injection method.

20. The non-transitory computer-readable storage medium of claim 15, wherein the rock physics model assumes no change in gas saturation or assumes no change in water saturation.

* * * * *